US009775090B2

(12) United States Patent
Bu et al.

(10) Patent No.: US 9,775,090 B2
(45) Date of Patent: Sep. 26, 2017

(54) METHOD AND EQUIPMENT FOR CONTROLLING MOBILE STATION TO SWITCH BETWEEN DIFFERENT WIRELESS COMMUNICATION SYSTEMS

(75) Inventors: Bing Bu, Beijing (CN); Hongli Zhao, Beijing (CN); Tao Tang, Beijing (CN)

(73) Assignee: Beijing Jiatong University, Beijing (CN)

( * ) Notice: Subject to any disclaimer, the term of this patent is extended or adjusted under 35 U.S.C. 154(b) by 836 days.

(21) Appl. No.: 13/813,938

(22) PCT Filed: Aug. 1, 2011

(86) PCT No.: PCT/CN2011/001254
§ 371 (c)(1),
(2), (4) Date: Apr. 8, 2013

(87) PCT Pub. No.: WO2012/061428
PCT Pub. Date: Feb. 9, 2012

(65) Prior Publication Data
US 2013/0196668 A1    Aug. 1, 2013

(30) Foreign Application Priority Data

Aug. 4, 2010    (CN) .......................... 2010 1 0245275

(51) Int. Cl.
*H04Q 7/10*        (2006.01)
*H04W 36/32*    (2009.01)
(Continued)

(52) U.S. Cl.
CPC ........... *H04W 36/32* (2013.01); *H04W 36/14* (2013.01); *H04W 8/26* (2013.01); *H04W 76/02* (2013.01); *H04W 76/06* (2013.01)

(58) Field of Classification Search
CPC ....... H04W 4/00; H04W 36/14; H04W 36/16; H04W 36/24; H04W 88/10
(Continued)

(56) References Cited

U.S. PATENT DOCUMENTS 7,539,138 B2 *   5/2009  Maenpaa .......... H04L 29/12311
                                                          370/235
7,936,708 B2 *   5/2011  Kesavan ................ H04W 48/18
                                                          370/331
(Continued)

FOREIGN PATENT DOCUMENTS

CN          1617603 A      5/2005
CN          1813484 A      8/2006
(Continued)

OTHER PUBLICATIONS

PCT Written Opinion of the International Searching Authority for PCT Counterpart Application No. PCT/CN2011/001254, 15 pages, (Nov. 3, 2011).

(Continued)

*Primary Examiner* — Kathy Wang-Hurst
*Assistant Examiner* — Julio Perez
(74) *Attorney, Agent, or Firm* — Blakely, Sokoloff, Taylor & Zafman LLP

(57) ABSTRACT

The present invention relates to a method and an equipment for controlling the mobile station to switch between different wireless communication systems and belongs to the technical field of data transmission in the wireless communication systems. In order to resolve the problem that there are no means in the prior art to effectively control the mobile station to switch between different wireless communication systems at specified position, the present invention uses different network identifications to distinguish different wireless communication systems, and a set of wireless
(Continued)

transceiver modules is mounted on the mobile station to associate with wireless communication system, and a set of independent receiving modules is mounted to receive the switch command from the ground sending device, the ground sending device sends the switch command when the mobile station passes the switching point; after receiving this switch command, the mobile station modifies its network identification according to the network identification comprised in the switch command for the target switching wireless communication system, and cuts off the link with the current wireless communication system and establishes the link with the target switching wireless communication system. This solution could realize the controlled switching for the mobile station between multiple overlapping wireless communication systems, and reduce the rate of wrong switching.

4 Claims, 3 Drawing Sheets

(51) Int. Cl.
  *H04W 36/14* (2009.01)
  *H04W 8/26* (2009.01)
  *H04W 76/02* (2009.01)
  *H04W 76/06* (2009.01)

(58) Field of Classification Search
  USPC ......... 455/435.2, 436, 437, 438, 442, 552.1; 370/329–332
  See application file for complete search history.

(56) References Cited

U.S. PATENT DOCUMENTS

| | | | | |
|---|---|---|---|---|
| 2005/0073977 A1* | 4/2005 | Vanghi | ............ | H04W 36/0066 370/335 |
| 2008/0096560 A1* | 4/2008 | Felske | ............ | H04W 36/0083 455/436 |
| 2008/0254800 A1* | 10/2008 | Chun | ............ | H04W 48/12 455/438 |
| 2009/0161626 A1* | 6/2009 | Crawford | ............ | H04W 36/14 370/331 |
| 2010/0040016 A1* | 2/2010 | Lor | ............ | H04W 12/06 370/331 |
| 2010/0069073 A1* | 3/2010 | Chen | ............ | H04W 36/14 455/437 |

FOREIGN PATENT DOCUMENTS

| | | |
|---|---|---|
| CN | 101170795 A | 4/2008 |
| CN | 101304604 A | 11/2008 |
| CN | 101170795 B | 5/2010 |
| CN | 101902791 A | 12/2010 |

OTHER PUBLICATIONS

PCT Notification concerning Transmittal of International Preliminary Report on Patentability (Chapter I of the Patent Cooperation Treaty) for PCT Counterpart Application No. PCT/CN2011/001254, 18 pages, (Feb. 14, 2013).

PCT International Search Report for PCT Counterpart Application No. PCT/CN2011/001254, 5 pgs., (Nov. 3, 2011).

* cited by examiner

METHOD AND EQUIPMENT FOR CONTROLLING MOBILE STATION TO SWITCH BETWEEN DIFFERENT WIRELESS COMMUNICATION SYSTEMS

CROSS-REFERENCE TO RELATED APPLICATIONS

This patent application is a U.S. National Phase Application under 35 U.S.C. §371 of International Application No. PCT/CN2011/001254, filed Aug. 1, 2011, entitled METHOD AND EQUIPMENT FOR CONTROLLING MOBILE STATION TO SWITCH BETWEEN DIFFERENT WIRELESS COMMUNICATION SYSTEMS, which claims priority to Chinese Patent Application No. 201010245275.3, filed Aug. 4, 2010.

TECHNICAL FIELD

The present invention relates to data transmission technology used in the wireless communication system, and in particular to a method and equipment for controlling mobile station to switch between different wireless communication systems.

BACKGROUND ART

In application, a mobile station is required to be controlled at the specified position for switching from one wireless communication system to another specified wireless communication system, and then communicates with the equipment connected with the aforesaid specified wireless communication system; the wireless communication system before and after switching may share the same backbone network, or may be connected to different backbone networks.

As shown in FIG. 1, the direction of the movement of the mobile station is indicated by an arrow in FIG. 1. Mobile station is required to be associated with wireless communication system 1 before reaching point A, at this time the data is transmitted between terminal K and terminal M by means of wireless network 1 and backbone network 1; the mobile station is required to be associated with wireless communication system 2 when reaching point A, at this time the data is transmitted between terminal K and terminal M by means of wireless network 2 and backbone network 1; the mobile station is required to be associated with wireless communication system 3 when reaching point B, at this time the data is transmitted between terminal K and terminal N by means of wireless network 3 and backbone network 2.

When compared with the current signal intensity received, the signal intensity received from another wireless communication system by mobile station is higher enough to reach a specified threshold value, the mobile station will choose to switch to the said wireless communication system. Because the mobile station randomly receives the wireless signal, at any point within the overlapping region of wireless communication system 1 and wireless communication system 2, it is possible for the mobile station to switch between wireless communication system 1 and wireless communication system 2 when moving in the direction as indicated by the arrow in FIG. 1; for the same reason, at any point within the overlapping region of wireless communication system 2 and wireless communication system 3, it is also possible for the mobile station to switch between wireless communication system 2 and wireless communication system 3. There is no effective means at the present for controlling the mobile station to switch to a specified wireless communication system at a specified position.

SUMMARY

The Technical Problem to be Resolved

The objective of the present invention is to resolve the problem that there is no effective means in the prior art for controlling the mobile station to switch at a specified point between different wireless communication systems, and to realize the controlled switch between multiple overlapping wireless communication systems.

Technical Solution

To resolve the problem said above, the present invention provides a method for controlling the mobile station to switch between different wireless communication systems, the said method comprising:

step 1 setting different network identifications respectively for multiple wireless communication systems involved in the communication process; setting the same network identification for the mobile station and the wireless communication system specified to be linked with the mobile station;

step 2 mounting ground sending device at the specified switching position;

step 3 the said ground sending device sending the switch command to the mobile station when the mobile station passes the specified switching position; the said switch command comprising the network identification for the current wireless communication system;

step 4 after receiving the switch command, the mobile station determining whether its network identification is the same as that comprised in the switch command for the current wireless communication system; if they are the same, the mobile station modifies its network identification according to the switch command;

step 5 the mobile station cutting off the link with the current wireless communication system;

step 6 the mobile station establishing the link with the target wireless communication system.

Wherein the said method further comprising the following prior to step 3, an independent receiving device for switch command is mounted at the mobile station, which is used for receiving the switch command sent by the ground sending device.

The said switch command comprises the network identification for the target switching wireless communication system.

Wherein the details of step 4 comprising are as follow:

step 4.1 after receiving the switch command, the mobile station would determine whether the network identification comprised in the switch command for the current wireless communication system is the same as that for the mobile station itself;

step 4.2 if the comparison result of step 4.1 is they are the same, the mobile station would modify its network identification; if the comparison result of step 4.1 is they are not the same, the mobile station would terminate the subsequent switching operation.

In the said step 4, after receiving the switch command, the mobile station modifies its network identification to the one comprised in the said switch command for the target switching wireless communication system.

In addition, an equipment for controlling the mobile station to switch between different wireless communication systems is further provided by the present invention, comprising:

wireless transceiver module, which is used for establishing association with the wireless communication system, receiving the business data sent by ground sending device via the wireless communication system, and sending the business data to the control module, the business data sent by the control module to the wireless communication system simultaneously; it is also used to receive the switch instruction from the control module and set the network identification for the mobile station itself according to the switch instruction;

independent receiving module for switch command, which is used to receive the switch command sent by the ground sending device and transmit the switch command to the control module;

control module, which is used to receive the business data transmitted by the wireless transceiver module and send the business data to the wireless transceiver module; it is also used to receive the switch command transmitted by the independent receiving module and determine whether the network identification for the mobile station is the same as that comprised in the switch command for the current wireless communication system, and send the switch instruction to the said wireless transceiver module according to the said switch command if they are the same.

Wherein, said control module comprising:

matching determination module, which is used to determine whether the network identification comprised in the switch command for the current wireless communication system matches with the network identification for the mobile station, and then send the said switch command to the module for generating the switch instruction if the match is confirmed;

module for generating the switch instruction, which is used to generate the switch instruction comprising the network identification for the target wireless communication system according to the said switch command, and send the said switch instruction to the said wireless transceiver module.

Beneficial Effects

Compared to the prior art, the technical solution in the present invention has the following beneficial effects.

1) using different network identifications to distinguish different wireless communication systems and setting the same network identification for the mobile station and the currently associated wireless communication system, which eliminates the problem of the identification conflict in the prior art caused by that the data are sent simultaneously to the mobile station from multiple wireless communication systems within the overlapping region;

2) the mobile station modifies its network identification to the network identification for the target wireless communication system according to the switch command sent by the ground sending device, which accomplishes the controlled switching for the mobile station at the overlapping region;

3) by comparing the network identification for the mobile station itself with the one comprised in the switch command for the current wireless communication system, the mobile station modifies its network identification only when they are the same, which prevents the ground sending device from controlling the switch of non-switch target mobile station which entering the switching position and reduces the rate of wrong switching.

DETAILED DESCRIPTION

Figure 1:
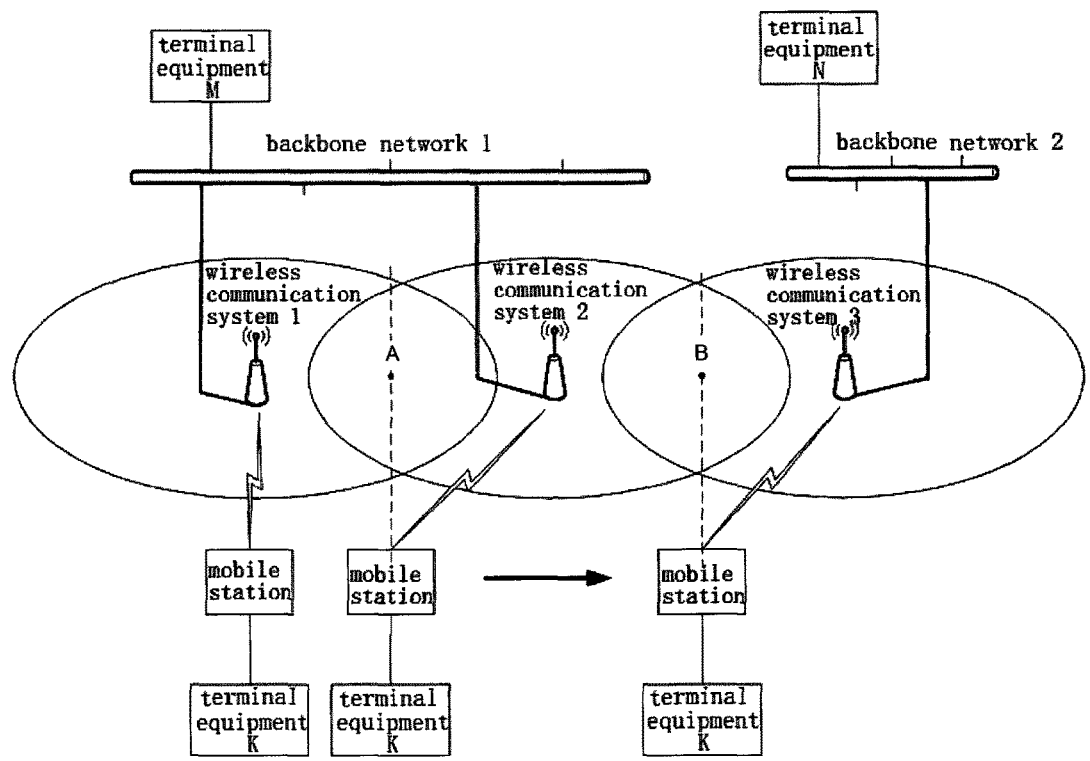
FIG. 1 is an illustrative drawing showing the mobile station in the prior art switching between different wireless communication systems.

For making the subject, content and advantages of the present invention more clear, a detailed description of the present invention is provided hereinafter with reference to the attached drawings and embodiments.

First, the method for controlling the mobile station to switch between different wireless communication systems is described according to the solution of the present invention, with which different wireless communication systems are distinguished by network identifications, and the network identification for the mobile station is modified according to the switch command sent by the ground sending device so as to be associated with the corresponding wireless communication system. A wireless transceiver module is mounted on the mobile station, which is used to be associated with the wireless communication system so as to transmit the data, and an independent receiving module for the switch command is also mounted on the mobile station, which is used to receive the switch command sent by the ground sending device. The ground sending device is mounted at the specified switch position, and when the mobile station passes the switch point, the ground sending device sends switch command to the mobile station which comprises both of the network identifications for the wireless communication system before and after the switch. The mobile station modifies its network identification when receiving the right switch command, and then switches to the target wireless communication system.

The said method comprises the following steps.

Figure 2:
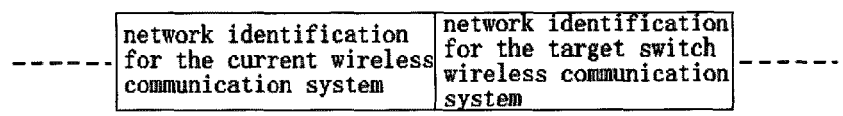
FIG. 2 is an illustrative drawing showing the structure of the switch command involved in one embodiment of the present invention.

1) setting different network identifications for multiple wireless communication systems, the mobile station is associated with the corresponding wireless communication system so as to send/receive data only when its network identification is the same as that for the wireless communication system; at the beginning, the network identification for the mobile station is set to be the same as that for the wireless communication system desired to be associated with, and then the mobile station is associated with this wireless communication system by which the data is sent/received;

2) mounting an independent receiving module for switch command on the mobile station to receive the switch command sent by the ground sending device;

3) mounting the ground sending device at the specified position;

The sequence among step 1), step 2) and step 3) can be subject to any change; furthermore, a wireless transceiver module is first arranged at the mobile station for associating with the wireless communication system to receive/send the business data, and for setting the network identification for the mobile station itself according to the switch instruction from the control module within the mobile station simultaneously; the function of the said control module is to generate switch instruction according to the switch command received by the said independent receiving module for switch command and to send the switch instruction to the said wireless transceiver module;

4) the ground sending device sends the switch command when the mobile station passes the specified switching position, the switch command comprising the network identification for the currently associated wireless communication system and the network identification for the switch target wireless communication system, as shown in FIG. 2;

5) after receiving the switch command sent by the ground sending device, the mobile station examines the content of the information, and modifies its network identification to the network identification for the switch target wireless communication system only when the network identification for the mobile station is the same as that comprised in the switch command for the current wireless communication system, and cuts off the link with the original wireless communication system and establishes the link with the target wireless communication system so as to send/receive data; the mobile station terminates the subsequent switching operation when the network identification for the mobile station is different from that for the current wireless communication system, and continues to communicate with the currently associated wireless communication system.

Figure 3:
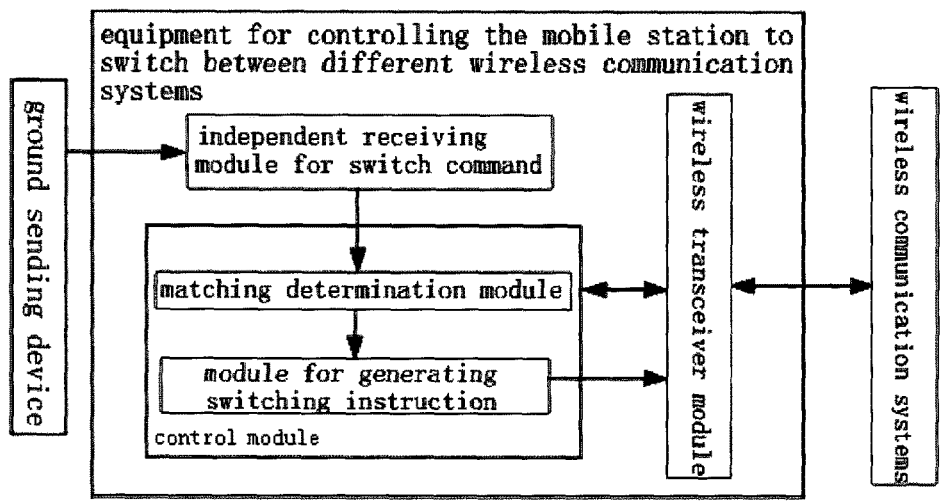
FIG. 3 is an illustrative drawing showing the structure of equipment according to one embodiment of the present invention.

An equipment for the aforesaid method of controlling the mobile station to switch between different wireless communication systems is described in detail as follows, as shown in FIG. 3, the equipment comprising:

wireless transceiver module, which is used to be associated with the wireless communication system, to receive the business data sent by the ground sending device via the wireless communication system, to send the business data to the control module, to send the business data sent by the control module to the wireless communication system simultaneously; it is also used to receive the switch instruction from the control module and set the network identification for the mobile station itself according to the switch instruction;

independent receiving module for switch command, which is used to receive the switch command sent by the ground sending device and transmit the switch command to the control module;

control module, which is used to receive the business data transmitted by the wireless transceiver module and send the business data to the wireless transceiver module; it is also used to receive the switch command transmitted by the independent receiving module for switch command and send the switch instruction to the said wireless transceiver module according to the said switch command.

Wherein, the said control module comprises:

matching determination module, which is used to determine whether the network identification comprised in the switch command for the current wireless communication system matches with the network identification for the mobile station, and then send the said switch command to the module for generating the switch instruction if the match is confirmed;

module for generating the switch instruction, which is used to generate the switch instruction comprising the network identification for the target wireless communication system according to the said switch command and send the said switch instruction to the wireless transceiver module.

Example 1

Figure 4:
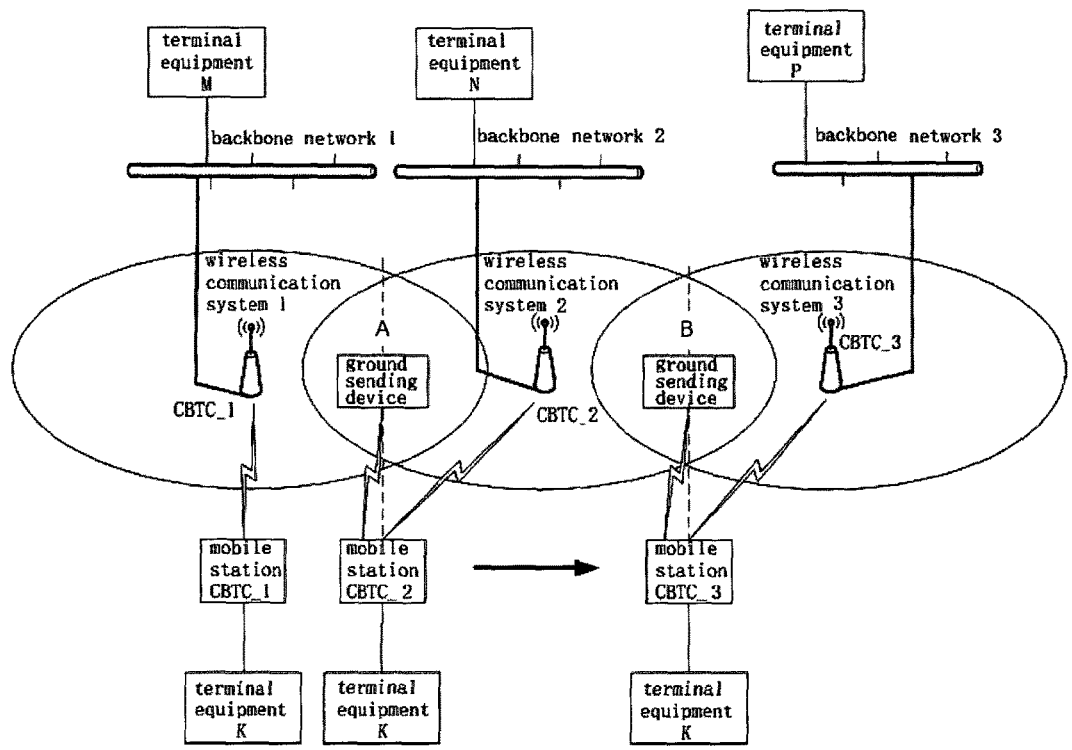
FIG. 4 is an illustrative drawing showing the mobile station according to embodiment 1 of the present invention switching between different wireless communication systems.

As shown in FIG. 4, there are three different wireless communication systems, wireless communication system 1, wireless communication system 2 and wireless communication system 3; terminal equipment M is connected with wireless communication system 1 by means of backbone network 1, terminal equipment N is connected with wireless communication system 2 by means of backbone network 2, terminal equipment P is connected with wireless communication system 3 by means of backbone network 3, backbone networks 1, 2 and 3 are either inter-linked with each other or independent of each other, terminal equipment K is connected with the mobile station. There are overlapping regions among wireless communication system 1, wireless communication system 2 and wireless communication system 3; now the mobile station is desired to switch from wireless communication system 1 to wireless communication system 2 at point A within the overlapping region of the wireless communication system 1 and the wireless communication system 2; the mobile station is also desired to switch from wireless communication system 2 to wireless communication system 3 at point B within the overlapping region of the wireless communication system 2 and the wireless communication system 3.

Firstly, the aforesaid wireless communication systems are distinguished by different network identifications; the network identification for wireless communication system 1 is "CBTC_1", the network identification for wireless communication system 2 is "CBTC_2", the network identification for wireless communication system 3 is "CBTC_3"; only when the network identification for the wireless transceiver module of the mobile station is the same as that for the wireless communication system, the link between the wireless transceiver module of the mobile station and the wireless communication system will be established so as to send/receive the data.

In the beginning, the wireless transceiver module of the mobile station is within the range covered by wireless communication system 1, with its network identification set as "CBTC_1". The wireless transceiver module of the mobile station is associated with wireless communication system 1, the link between terminal equipment K and terminal equipment M is established via the mobile station, wireless communication system 1 and backbone network 1, before sending/receiving data.

The ground sending device is mounted at the specified position A and B;

The ground sending device sends the switch command to the independent receiving module for switch command of the mobile station when the mobile station passes point A; the said switch command comprising network identification "CBTC_1" for the current wireless communication system and network identification "CBTC_2" for the target switching wireless communication system.

After receiving the switch command, the independent receiving module for switch command of the mobile station sends this switch command to the matching determination module within the control module, the matching determination module determines whether the network identification for the current wireless communication system comprised in this switch command is the same as its network identification or not, when the network identification comprised in this switch command for the current wireless communication system is "CBTC_1", i.e. the same as its network identification, the matching determination module sends this switch command to the module for generating the switch instruction; and then the module for generating the switch instruction orders the wireless transceiver module to modify its own network identification to the network identification "CBTC_2" for the target wireless communication system; the mobile station will terminate the subsequent operation when the network identification comprised in the switch command for the current wireless communication system is different from its network identification and continue to communicate with the currently associated wireless communication system.

After the wireless transceiver module of the mobile station modifies its network identification to "CBTC_2", it cuts off the link with wireless communication system 1 and establishes the link with wireless communication system 2.

The ground sending device sends the switch command to the independent receiving module for switch command of the mobile station when the mobile station passes point B; the said switch command comprising network identification "CBTC_2" for the current wireless communication system and network identification "CBTC_3" for the target switching wireless communication system;

After receiving the switch command, the independent receiving module for switch command of the mobile station sends this switch command to the matching determination module within the control module, the matching determination module would determine whether the network identification for the current wireless communication system comprised in this switch command is the same as its network identification, if the network identification comprised in this switch command for the current wireless communication system is "CBTC_2", i.e. the same as its network identification, the matching determination module sends this switch command to the module for generating the switch instruction; and then the module for generating the switch instruction orders the wireless transceiver module to modify its own network identification to the network identification "CBTC_3" for the target wireless communication system; the mobile station would terminate the subsequent operation when the network identification comprised in the switch command for the current wireless communication system is different from its network identification, and continue to communicate with the currently associated wireless communication system.

After the wireless transceiver module of the mobile station modifies its network identification to "CBTC_3", the link with wireless communication system 2 is cut off, while the link with wireless communication system 3 is established.

Thus the mobile station accomplishes all desired switch operation.

Example 2

Figure 5:
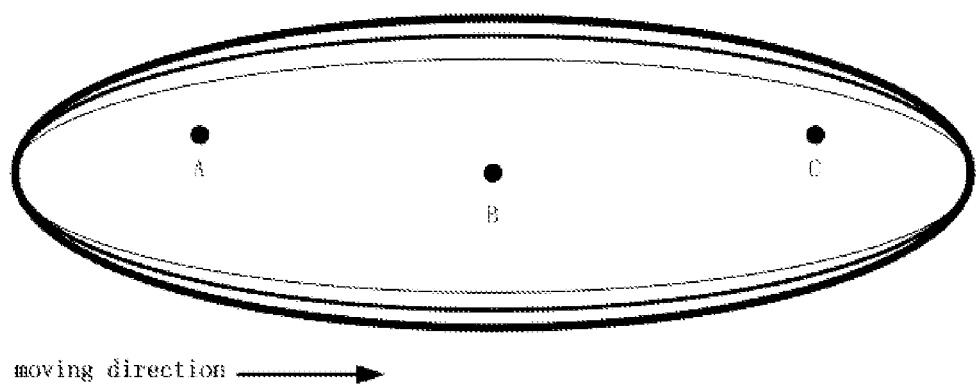
FIG. 5 is an illustrative drawing showing the mobile station according to embodiment 2 of the present invention switching between different wireless communication systems.

As shown in FIG. 5, there are three different wireless communication systems, wireless communication system 1, wireless communication system 2 and wireless communication system 3; the regions covered by wireless communication systems 1, 2, 3 are entirely overlapped. In the beginning, the mobile station is associated with wireless communication system 1, now the mobile station is desired to switch to wireless communication system 2 at point A, to wireless communication system 3 at point B, and to wireless communication system 1 at point C.

First, three wireless communication systems said above are distinguished by different network identifications; the network identification for wireless communication system 1 is "DCS_1", the network identification for wireless communication system 2 is "DCS_2", the network identification for wireless communication system 3 is "DCS_3"; only when the network identification for the wireless transceiver module of the mobile station is the same as that for the wireless communication system, the wireless transceiver module of the mobile station establishes the link with the wireless communication system so as to send/receive data.

In the beginning, the wireless transceiver module of the mobile station sets its network identification as "DSC_1", it is associated with wireless communication system 1 so as to send/receive data.

Ground sending devices are mounted at specified positions A, B and C;

The ground sending device sends the switch command to the independent receiving module for switch command of the mobile station when the mobile station passes point A; the said switch command comprising network identification "DCS_1" for the current wireless communication system and network identification "DCS_2" for the target switch wireless communication system.

After receiving the switch command, the independent receiving module for switch command of the mobile station sends this switch command to the matching determination module within the control module, the matching determination module would determine whether the network identification for the current wireless communication system comprised in this switch command is the same as its network identification, if the network identification comprised in this switch command for the current wireless communication system is "DCS_1", i.e. the same as its network identification, the matching determination module would send this switch command to the module for generating the switch instruction; and then the module for generating the switch instruction orders the wireless transceiver module to modify its own network identification to the network identification "DCS_2" for the target wireless communication system; the mobile station would terminate the subsequent operation when the network identification comprised in the switch command for the current wireless communication system is different from its network identification and continue to communicate with the currently associated wireless communication system.

After the wireless transceiver module of the mobile station modifies its network identification to "DCS_2", it cuts off the link with wireless communication system 1 and establishes the link with wireless communication system 2.

The ground sending device sends the switch command to the independent receiving module for switch command of the mobile station when the mobile station passes point B; the said switch command comprising network identification "DCS_2" for the current wireless communication system and network identification "DCS_3" for the target switching wireless communication system.

After receiving the switch command, the independent receiving module for switch command of the mobile station sends this switch command to the matching determination module within the control module, the matching determination module would determine whether the network identification for the current wireless communication system comprised in this switch command is the same as its network identification, if the network identification comprised in this switch command for the current wireless communication system is "DCS_2", i.e. the same as its network identification, the matching determination module would send this switch command to the module for generating the switch instruction; and then the module for generating the switch instruction orders the wireless transceiver module to modify its own network identification to the network identification "DCS_3" for the target wireless communication system; the mobile station would terminate the subsequent operation when the network identification comprised in the switch command for the current wireless communication system is different from its network identification, and continue to communicate with the currently associated wireless communication system.

After the wireless transceiver module of the mobile station modifies its network identification to "DCS_3", it cuts off the link with wireless communication system 2 and establishes the link with wireless communication system 3.

The ground sending device sends the switch command to the independent receiving module for switch command of the mobile station when the mobile station passes point C; the said switch command comprising network identification "DCS_3" for the current wireless communication system and network identification "DCS_1" for the target switch wireless communication system.

After receiving the switch command, the independent receiving module for switch command of the mobile station sends this switch command to the matching determination module within the control module, the matching determination module would determine whether the network identification for the current wireless communication system comprised in this switch command is the same as its own network identification, if the network identification comprised in this switch command for the current wireless communication system is "DCS_3", i.e. the same as its network identification, the matching determination module would send this switch command to the module for generating the switch instruction; and then the module for generating the switch instruction orders the wireless transceiver module to modify its own network identification to the network identification "DCS_1" for the target wireless communication system; the mobile station would terminate the subsequent operation when the network identification comprised in the switch command for the current wireless communication system is different from its network identification, and continue to communicate with the currently associated wireless communication system.

After the wireless transceiver module of the mobile station modifies its network identification to "DCS_1", it cuts off the link with wireless communication system 3 and establishes the link with wireless communication system 1;

Thus the mobile station accomplishes all desired switch operation.

It is to be understood that the above-described arrangements are only illustrative of the application of the principles of the present invention. Numerous modifications and alternative arrangements may be devised by those skilled in the art without departing from the spirit and scope of the present invention, such modifications and arrangements are also understood to be within the scope of the present invention.

INDUSTRIAL APPLICABILITY

The present invention eliminates the problem of identification conflict caused by that the data are sent simultaneously by multiple wireless communication systems at the overlapping region in the prior art, realizes the controlled switch for the mobile station at the overlapping region, and prevents the ground sending device controlling the switch of non-switch target mobile station entering the switching position and reduces the rate of wrong switching.

What is claimed is:

1. A method for controlling a mobile station to switch from a first wireless communication system to a second wireless communication system during a communication process, the method comprising:

setting a first network identification for the first wireless communication system and a second network identification for the second wireless communication system, wherein the first and second network identifications are different from each other;

setting a third network identification for the mobile station to be equal to the first network identification for the first wireless communication system;

in response to the setting of the third network identification, establishing a first communication link between the mobile station and the first wireless communication system, wherein the first communication link enables the mobile station and the first wireless communication system to communicate data with each other during the communication process;

mounting an independent receiving device at the mobile station to receive a switch command, wherein the independent receiving device is independent of the communication process between the first wireless communication system and the second wireless communication system;

transmitting the switch command to the independent receiving device at the mobile station as the mobile station passes a specified switching position, wherein data of the first wireless communication system and data of the second wireless communication system are not extracted by the independent receiving device at the mobile station prior to receiving the switch command, and wherein the independent receiving device receives the switch command by using an independent communication process that is independent of the communication process between the first wireless communication system and the second wireless communication system;

wherein the switch command includes the first network identification and the second network identification;

wherein the switch command is sent by a ground sending device mounted at the specified switch position, the ground sending device is independent of the communication process between the first wireless communication system and the second wireless communication system, and the ground sending device sends the switch command using the independent communication process;

wherein the data of the first wireless communication system and the data of the second wireless communication system are not extracted by the ground sending device, and wherein the first network identification and the second network identification are previously stored in the ground sending device;

in response to the mobile device receiving the switch command, determining, by the mobile station, whether the third network identification for the mobile station is equal to the first network identification for the first wireless communication system that is included in the switch command;

in response to the mobile station determining that the third network identification is equal to the first network identification in the switch command, modifying, by the mobile station, the third network identification to be equal to the second network identification for the second wireless communication system that is included in the switch command;

in response to the modification, terminating, by the mobile station, the first communication link formed between the mobile station and the first wireless communication system; and in response to at least one of the modification or the termination, establishing a second communication link between the mobile station and the second wireless communication system, wherein the second communication link enables the mobile station and the second wireless communication system to communicate data with each other during the communication process, and wherein the independent receiving device controls a wireless transceiver module that is configured to establish the second communication link between the mobile station and the target wireless communication system.

2. The method of claim 1, wherein the specified switch position is between the first wireless communication system and the second wireless communication system.

3. An apparatus for controlling a mobile station to switch from a current wireless communication system to a target wireless communication system during a communication process, the apparatus comprising:

a wireless transceiver module configured to:
set a network identification of the mobile station to be equal to a network identification of the current wireless communication system;
establish a first communication link between the mobile station and the current wireless communication system, wherein the first communication link enables the mobile station and the current wireless communication system to communicate data with each other during the communication process;
receive a switch instruction;
in response to receiving the switch instruction, modify the network identification of the mobile station to be equal to a network identification of the target wireless communication system; and
in response to the modification, establish a second communication link between the mobile station and the target wireless communication system, wherein the second communication link enables the mobile station and the target wireless communication system to communicate data with each other during the communication process;

an independent receiving module configured to:
receive a switch command as the mobile station passes a specified switching position, wherein the independent receiving module is independent of the communication process between the first wireless communication system and the second wireless communication system, wherein data of the first wireless communication system and data of the second wireless communication system are not extracted by the independent receiving device at the mobile station prior to receiving the switch command, and wherein the independent receiving device receives the switch command by using an independent communication process that is independent of the communication process between the first wireless communication system and the second wireless communication system, wherein the switch command includes the network identification of the current wireless communication system and the network identification of the target wireless communication system, wherein the specified switch position is between the current wireless communication system and the target wireless communication system, wherein the switch command is sent by a ground sending device mounted at the specified switch position, the ground sending device is independent of the communication process between the first wireless communication system and the second wireless communication system, and the ground sending device sends the switch command using the independent communication process, and wherein the data of the first wireless communication system and the data of the second wireless communication system are not extracted by the ground sending device, and wherein the first network identification and the second network identification are previously stored in the ground sending device, and wherein the independent receiving device controls the wireless transceiver module configured to establish the second communication link between the mobile station and the target wireless communication system; and a control module configured to:
determine, based on the switch command received by the independent receiving module, whether the network identification of the mobile station is equal to the network identification of the current wireless communication system that is included in the switch command; and
when the network identification of the mobile station is equal to the network identification of the current wireless communication system that is included in the switch command, transmit the switch instruction to the wireless transceiver module.

4. The apparatus of claim 3, wherein the control module comprises:
a matching determination module configured to perform the determination of whether the network identification of the mobile station is equal to the network identification of the current wireless communication system that is included in the switch command; and
a module to generate switching instruction configured to:
generate the switch instruction, wherein the switch instruction comprises the network identification for the target wireless communication system according to the switch command; and
perform the transmitting of the switch instruction to the wireless transceiver module.

* * * * *